(12) United States Patent
Schedgick et al.

(10) Patent No.: US 8,406,966 B2
(45) Date of Patent: Mar. 26, 2013

(54) DRAFT CONTROL METHOD FOR OPERATING AN EARTH MOVING MACHINE

(75) Inventors: David James Schedgick, Menasha, WI (US); Eric N. Griesbach, North Prairie, WI (US)

(73) Assignee: HUSCO International, Inc., Waukesha, WI (US)

( * ) Notice: Subject to any disclaimer, the term of this patent is extended or adjusted under 35 U.S.C. 154(b) by 218 days.

(21) Appl. No.: 13/006,114

(22) Filed: Jan. 13, 2011

(65) Prior Publication Data

US 2012/0185137 A1    Jul. 19, 2012

(51) Int. Cl.
G06F 7/70     (2006.01)
G06F 19/00    (2006.01)
G06G 7/00     (2006.01)
G06G 7/76     (2006.01)

(52) U.S. Cl. .............. 701/50; 172/7; 172/239
(58) Field of Classification Search ........... 701/50; 172/7–12, 3, 4, 4.5, 239, 439; 280/446.1, 280/449, 492
See application file for complete search history.

(56) References Cited

U.S. PATENT DOCUMENTS

| | | | |
|---|---|---|---|
| 3,834,738 A | 9/1974 | Koch | |
| 3,943,824 A | 3/1976 | Fletcher | |
| 3,990,520 A | 11/1976 | Koch et al. | |
| 4,057,109 A | 11/1977 | Nelson | |
| 4,139,063 A | 2/1979 | Adams | |
| 4,329,911 A | 5/1982 | Schwerin | |
| 4,438,818 A | 3/1984 | Treichel et al. | |
| 4,508,176 A | 4/1985 | Wiegardt et al. | |
| 4,646,620 A | 3/1987 | Buchl | |
| 4,738,463 A | 4/1988 | Poore et al. | |
| 4,809,785 A | 3/1989 | Arnold et al. | |
| 4,969,527 A | 11/1990 | Boe et al. | |
| 4,979,092 A | 12/1990 | Bergene et al. | |
| 5,143,159 A | 9/1992 | Young et al. | |
| 5,899,279 A | 5/1999 | Bennett et al. | |
| 5,911,769 A * | 6/1999 | Orbach et al. ............... 701/50 |

FOREIGN PATENT DOCUMENTS

EP    0655185    12/1999
WO    2010133285    11/2010

* cited by examiner

*Primary Examiner* — Thomas Tarcza
*Assistant Examiner* — Kevin Myhre
(74) *Attorney, Agent, or Firm* — Quarles & Brady LLP; George E. Haas

(57) ABSTRACT

The hitch on a vehicle is moved by a hydraulic actuator. A method for controlling the hydraulic actuator defines a draft force setpoint in response to separately averaging two forces acting on lateral sides of the hitch, while operating in a configuration mode. During regular operation, a draft load is calculated from sensing those two forces and deriving a draft force error from difference between the draft load and the draft force setpoint. The draft force error is used to control fluid flow to and from the hydraulic actuator. One aspect of the control method derates the draft force error as the hitch moves beyond a predefined threshold position.

20 Claims, 3 Drawing Sheets

DRAFT CONTROL METHOD FOR OPERATING AN EARTH MOVING MACHINE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to earth-working equipment, such as an agricultural implement pulled by a tractor, and more particularly to a method for controlling a hydraulic system that operates a hitch that couples the agricultural implement to the tractor.

2. Description of the Related Art

A variety of agricultural implements are available to be pulled by a tractor for working earth in a farm field in which crops will be or have been planted. The implement is connected to a standard three-point hitch with right and left drag links on the rear of the tractor and the hitch can be operated to raise and lower the implement. The hitch is hydraulically driven by a system that typically provides one or both of position control and draft or load control.

The position control maintains the implement at a constant working depth in spite of differences in soil conditions. When employing solely position control, an operator input device is set to establish a desired vertical position of the three-point hitch with respect to a geometric plane established by the tractor. The operator input device sends a command signal to the hydraulic system to either raise or lower the hitch. A position feedback system senses the actual hitch position and stops the raising or lowering once the desired position is reached. This position is maintained by the control system until manually changed by the operator. A problem with maintaining a fixed position of the implement is that hard soil or an obstruction can exert such a large force that the tractor engine stalls.

Draft control raises and lowers the hitch during plowing so that the draft force that the implement exerts on the hitch remains constant, despite irregularities in the soil. Thus the draft control enables the working implement to operate effectively without stalling of the tractor engine even in the presence of obstacles such as stones. A tractor employing only draft control has a force sensor connected with the hydraulic system that elevates or lowers the implement hitch. This mechanism raises the hitch as the draft force increases and lowers the hitch as the draft force decreases. An operator input device establishes one or more parameters, such as the force threshold that must occur before the implement is raised of lowered.

In certain situations, each of these control techniques alone is not entirely satisfactory. Thus, some previous control systems employed both position and draft control. In that case, the position of the hitch is raised and lowered in response to changes in the sensed draft force, but the position is held within a range set by operator defined upper and lower threshold positions. The threshold range expands and contracts based on a draft setting provided by the operator. As the draft force increases, the hitch begins to rise until the upper threshold position is reached or until the draft force decreases. As the force decreases, the hitch lowers until the lower threshold position is reached or until the draft force increases.

The operator draft setting is influenced by a number of factors, including type of implement, commanded depth, soil composition, and soil moisture content. There often is no correlation between the operator setting and the specific position and draft force. These factors make the operator draft setting a trial and error proposition.

Another concern relates to adverse control effects that result from lateral forces acting on the implement. Some implements act to roll soil toward one side of the vehicle creating a load with a resultant force vector oriented at a significant angle away from the direction of vehicle travel. A hitch with right and left drag links observes this type of loading as positive load force on one drag link and negative load force on the opposite drag link. If these load forces are sensed and merely averaged, the control system does not recognize a change in loading and does not respond to changes in draft load, or operates at a significantly reduced level of sensitivity to these loading conditions.

As a consequence, there is a need for a hydraulic control system that provides an enhanced combination of position and draft control.

SUMMARY OF THE INVENTION

A vehicle has a hitch for towing an implement that can be raised and lowered by movement of the hitch. The hitch is moved by operating a valve to control the flow of fluid to and from a hydraulic actuator which is mechanically coupled to the hitch.

A method for controlling a hitch comprises defining a draft setpoint that specifies an amount draft force desired to be exerted on the hitch. During operation of the vehicle a first draft force acting on one side of the hitch is sensed and a second draft force acting on another side of the hitch is sensed. A draft load is derived as a function of a greater one of the first draft force and the second draft force and a difference between the first and second draft forces. The draft load and the draft setpoint then are employed to produce a draft force error. For example, the draft force error is based on the difference between the draft load and the draft setpoint. The valve is operated in response to the draft force error to selectively raise and lower the hitch and thus the implement attached to the hitch.

Another aspect of the present method involves defining a draft force setpoint in response to actual operating conditions encountered by the vehicle while pulling an implement through specific soil conditions. At that time, a first plurality of samples of the first draft force and a second plurality of samples the second draft force are sensed. For example the first and second draft force may be sensed on opposite lateral sides of the hitch. Then, a first average of the first plurality of samples and a second average of the second plurality of samples are calculated. The draft setpoint is derived as a function of a greater one of the first average and the second average and a difference between those averages. In a particular embodiment of the present method deriving the draft setpoint involves adding the greater one of the first average and the second average to a term based on an absolute value of the difference between the first and second averages.

During subsequent operation of the vehicle, the draft load is similarly derived by adding the greater of the first draft force and the second draft force to a term based on an absolute value of the difference between the first and second draft forces.

Another aspect of the present method derates the draft force and the resultant error value as the hitch approaches a limit of its possible motion. For example, there is a upper position beyond which the hitch cannot be physically raised. The control system also defines an upper threshold position above which the hitch is not desired to move while working a particular farm field. Draft forces acting on the hitch may cause the control system to raise the hitch above the upper threshold position, in which event the draft load is reduced proportionally. In particular, the draft load is reduced, derated, based on a first relationship between the actual position of the hitch and the upper limit position, and in response to a second relationship between the threshold position and the upper limit position. For example, a first difference between the actual hitch position and the upper limit position, and a second difference between the upper threshold position and the upper limit position are calculated. The draft load is multiplied by a ratio of the first difference to the second difference and the product becomes a new draft load value that is used to determine the draft force error.

DETAILED DESCRIPTION OF THE INVENTION

Figure 1:
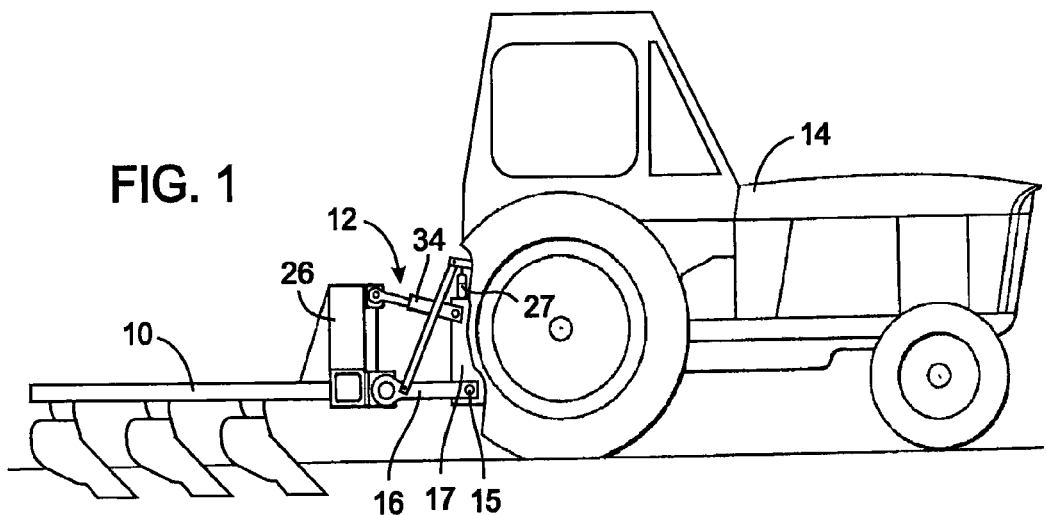
FIG. 1 illustrates a tractor pulling an agricultural implement.
Figure 2:
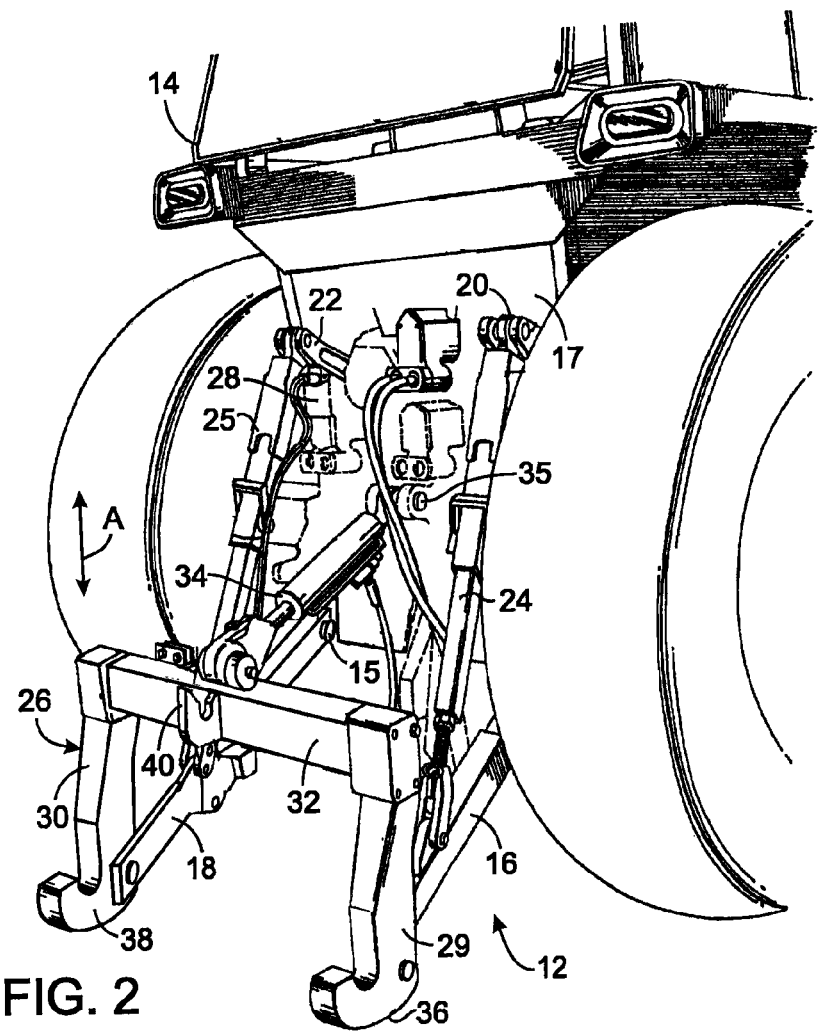
FIG. 2 shows a typical three-point hitch on the tractor for attaching an implement.

With initial reference to FIGS. 1 and 2, an implement 10, such as a multiple blade agricultural plow, is connected by a three-point hitch 12 to the rear of a tractor 14. The hitch 12 comprises right and left drag links 16 and 18, the proximal ends of which are pivotally attached to the tractor frame 17 by pins 15. A pair of lift arms 20 and 22, connected to the drag links 16 and 18 by lift links 24 and 25, control the elevation of the drag links. Two hydraulic actuators 27 and 28, in this case single acting lift hydraulic cylinders, are connected between the lift arms 20 and 22 and the tractor frame 17 to pivot the lift arms up and down with respect to that frame.

The distal ends of the drag links 16 and 18 are respectively attached to vertically extending legs 29 and 30 of a coupler 26 that has a cross bar 32 connected between the upper ends of the legs. A link hydraulic cylinder 34 is attached at one end to the cross bar 32 and at the other end to the tractor frame 17 by a pin 35. A pair of lower lift hooks 36 and 38 project rearward from the bottom ends of legs 29 and 30 and an upper lift hook 40 is positioned in the middle of a cross bar 32. The lift arms 20 and 22 move the coupler 26 bi-directionally along a principal axis "A" of coupling motion, which in this case is vertical.

The lower and upper lift hooks 36, 38 and 40 cooperate with mating parts on a hitch structure of the implement 10. Specifically the lower lift hooks 36 and 38 engage the lower hitch pins that extend laterally with respect to the frame of the implement. The implement also has a laterally extending upper hitch pin that is received in the upper lift hook 40 when the implement 10 is coupled to the tractor 14. The trio of lift hooks 36, 38 and 40 form the three points of the hitch 12.

Figure 3:
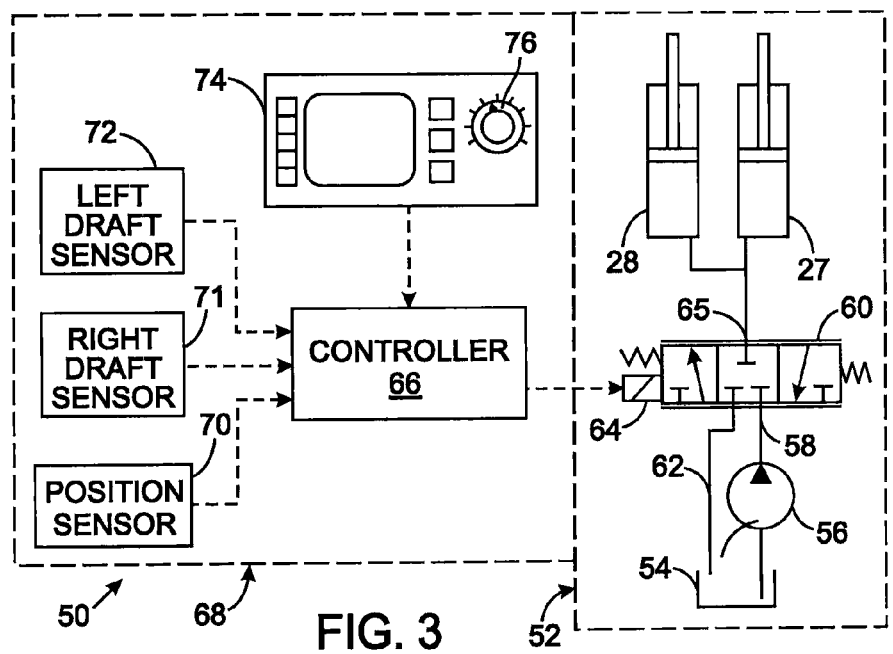
FIG. 3 is a diagram of the hydraulic system for operating the three-point hitch.

With reference to FIG. 3, the control system 50 for operating the three point hitch 12 comprises a hydraulic section 52 and an electronic section 68. The hydraulic section 52 includes a tank 54, which holds hydraulic fluid, and a pump 56, that when driven by the engine of the tractor 14 sends pressurized hydraulic fluid from the tank through a supply line 58. A supply line 58 is connected to an electrohydraulic three-position, three-way valve 60 and tank return line 62 couples the valve to the tank 54. The valve 60 has a workport 65 connected to the head chambers of the two lift hydraulic actuators 27 and 28.

The valve 60 is operated by a solenoid 64 that is energized by an electric current from a controller 66 within the electronic section 68 of the control system 50. The controller 66 is a microcomputer-based device that includes memory for storing software and data for a hitch control program. The controller further comprises a driver circuit that produces a variable electric current level for driving the solenoid 64 to proportionally operate the electrohydraulic valve 60. In addition, the controller 66 has analog and digital input ports for receiving signals from several sensors and operator input devices on the tractor 14.

The controller 66 receives a signal from a position sensor 70 that indicates the vertical position of the coupler 26 of the three point hitch 12. Any of several types of sensing mechanisms can be employed. For example, the position sensor 70 may be a linear device connected to one of the lift hydraulic actuators 27 or 28 to produce a signal as the piston rod extends and contracts from the cylinder body. Alternatively, a rotational type position sensor can be connected to one of the lift arms 20 or 22 to provide a signal indicating the rotational position of that arm with respect to the tractor frame 17. With both of these sensing techniques, the signal from the position sensor 70 indicates a position that is geometrically related to the vertical position of the hitch coupler 26 with respect to the tractor frame 17. The controller 66 also receives signals from right and left draft force sensors 71 and 72. These sensors may be conventional clevis pin type sensors which are incorporated into the pins 15 that couple the left and right drag links 16 and 18 to the tractor frame 17. The present control system 50 is being described in the context of left and right sensors which have the advantage of measuring the different forces being exerted on both lateral sides of the three point hitch 12. Alternatively, a single clevis pin sensor can be used in the pin 35 that connects the link hydraulic cylinder 34 to the tractor frame 17. Other types of sensors can be utilized to produce electrical signals indicating the magnitude of the draft force acting on the three point hitch 12.

A human interface 74 also produces signals that are applied to inputs of the controller 66. The human interface 74 enables the operator of the tractor 14 to set configuration settings for and send commands to the controller, thereby defining operation of the hydraulic section 52. In particular as will be describes, input switches 75 and a display screen 77 are used to define a desired depth position for the implement and range of positions in which the implement may be freely moved as the draft forces change. A mix input device 76 on the human interface 74 adjusts the draft force sensitivity and control system gain values, as will be described. For example, the mix input device 76 is a knob that is rotated between two extreme positions indicating zero sensitivity and maximum sensitivity and produces either a digital or analog signal indicating the position of that knob.

Figure 4:
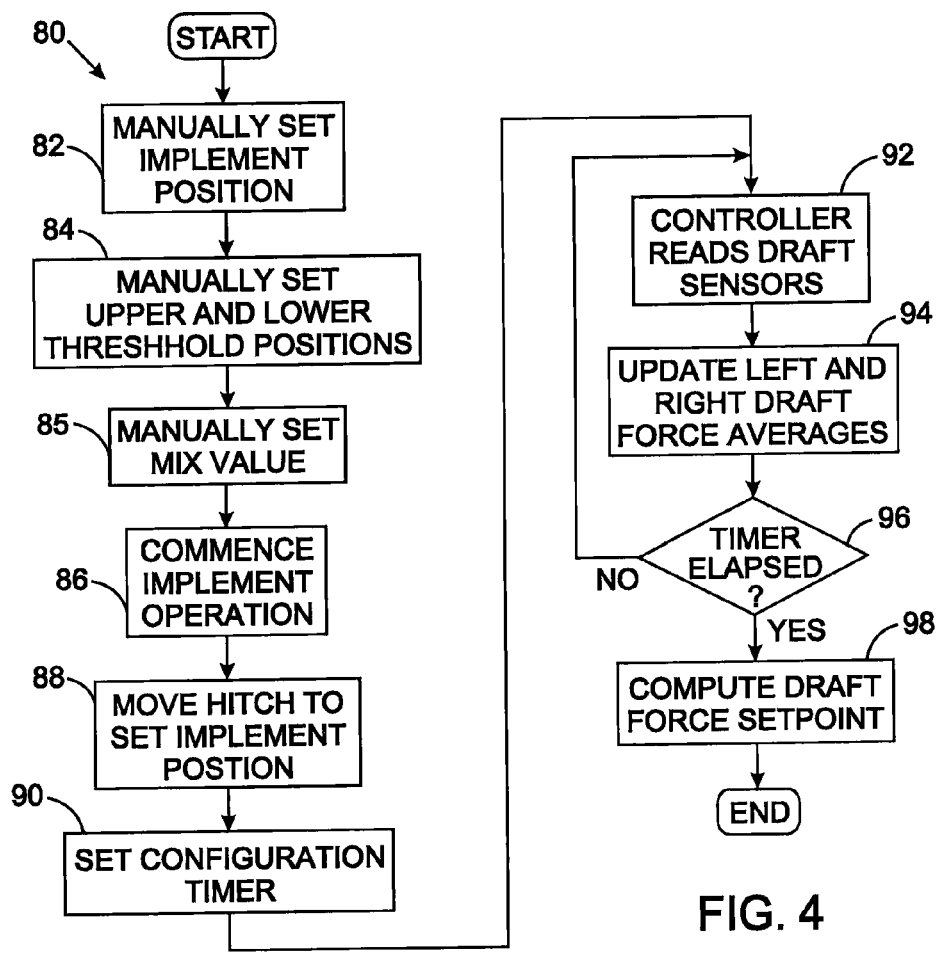
FIG. 4 is a flowchart depicting the process by which the draft control system is configured for a particular implement and specific soil conditions.

When it is desired to use the implement in a farm field, the operator places the control system 50 into mode in which a configuration routine 80 depicted in FIG. 4 is executed by the controller 66. In this configuration mode, the tractor operator manipulates the human interface 74 at step 82 to define a desired depth position for the implement 10 in the soil and thus the desired position of the hitch 12. At step 84, the operator also uses the human interface 74 to set an upper threshold position and a lower threshold position, thereby defining a range of positions in which the hitch 12 may move up and down as soil conditions change. The mix input device 76 also is placed into the desired setting for the sensitivity of the draft control process at step 85. In other words, the mix setting specifies how quickly and to what degree the control system responds to changes in the draft forces acting on the hitch. That mix setting is indicated by an electrical signal designating a numerical value (MIX). Placing the knob of the mix input device 76 at one extreme position produces a minimum MIX value, whereas the other extreme position produces a maximum MIX value. Intermediate positions of the knob produce proportional values between the minimum and maximum MIX values.

Then at step 86 the operator starts to move the tractor 14 forward causing the implement 10 to dig into the soil until reaching the desired depth position at step 88, which is determined by the signal read from the position sensor 70 by the controller 66.

Upon reaching the desired depth position, the controller 66 at step 90 sets a configuration timer to a predefined period of time, such as two seconds, for example. During this period, the position of the hitch 12 is held fixed and the controller periodically reads the signals from the right and left draft force sensors 71 and 72 at step 92. At step 94 the newly acquired samples are averaged with other samples taken by the configuration routine thereby calculating separate averages for the right and left draft forces. Then a determination is made at step 96 whether the configuration timer period has elapsed. If not, the configuration routine 80 returns to read the draft force sensors again and obtain another pair of data samples for use in calculating the right and left draft force averages. This process determines how much load on the hitch is created by the soil conditions in the particular farm field.

Eventually, the configuration timer expires at which point the configuration routine 80 advances to step 98 to produce a draft setpoint. It should be appreciated that with certain kinds of implements, especially plows, there can be a large difference between the draft forces exerted on opposite lateral sides of the hitch 12. This difference increases as the pulling load on the implement 10 becomes greater. Therefore, the draft setpoint is produced by taking this lateral difference into account. The draft setpoint is computed according to Equation (1):

Draft Setpoint=Maximum(Average Right Draft Force, Average Left Draft Force)+Gain*abs(Average Right Draft Force−Average Left Draft Force) (1)

where the "Maximum" term selects the greater of the right and left draft force averages, Gain is a predefined factor that specifies the sensitivity of the force difference, and the "abs" term selects the absolute value of the difference between the right and left draft force averages. Once the Draft Setpoint has been derived, the configuration routine 80 terminates.

This automatic determination of the draft setpoint, based on the actual draft forces encountered while the implement is working the soil, eliminates the need for the operator to make manual adjustments to the position and mix settings during tractor operation. This provides consistent plowing operation while the implement works an entire farm field.

Figure 5:
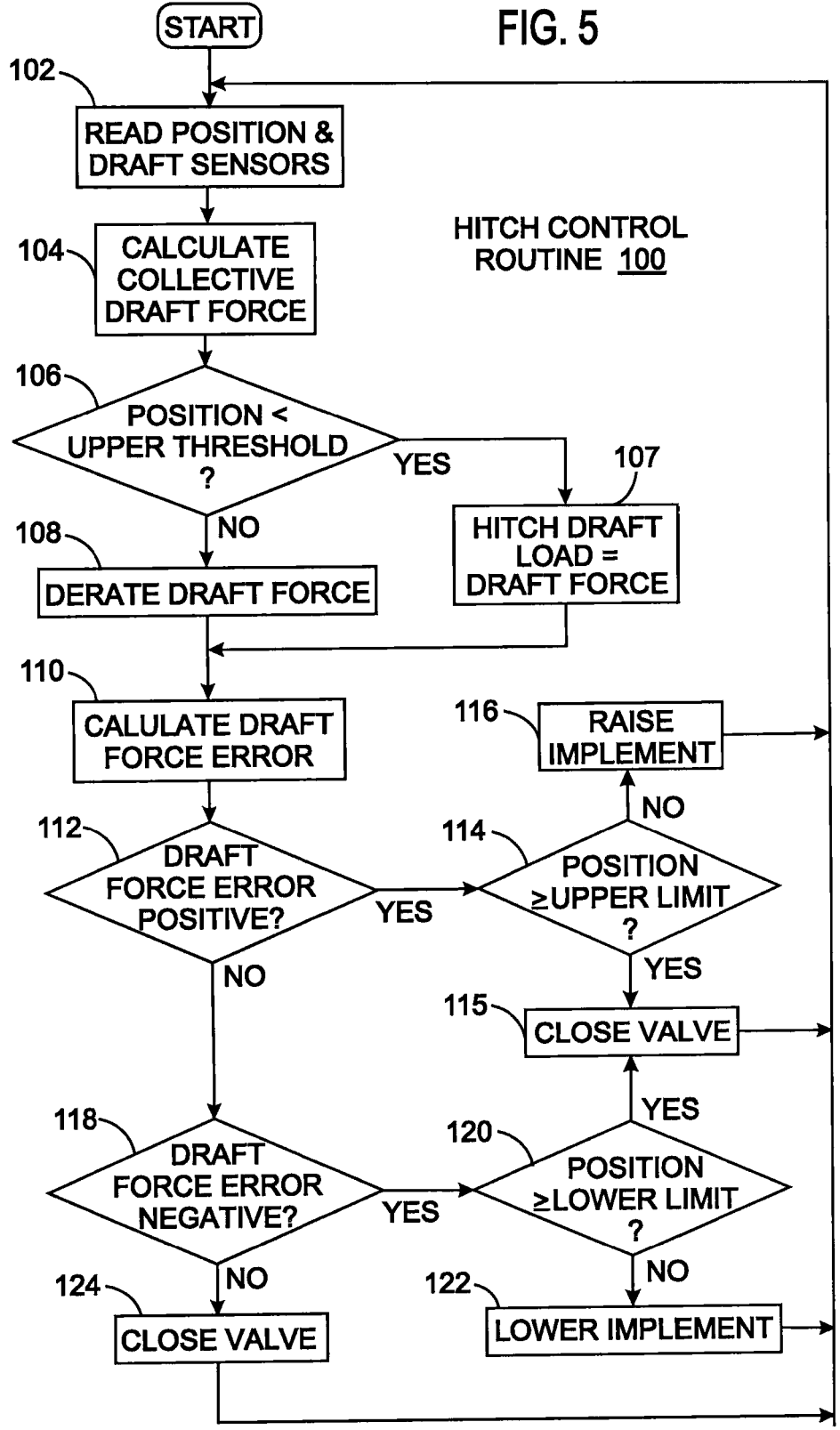
FIG. 5 is a flowchart depicting the draft control process used while the agricultural implement is working the soil in a farm field.

As the operator continues to drive the tractor with the implement working the soil, the controller 66 executes a hitch control routine 100 depicted by the flowchart in FIG. 5. The execution makes continuing passes through this routine, periodically reading the draft forces from the sensors 71 and 72 and the position of the implement from the position sensor 70. The sensor data are used to operate the control valve 60 in a manner wherein a constant draft force is exerted on the implement 10.

The controller 66 reads the signals from the position sensor 70 and the force sensors 71 and 72 and derives values for the actual hitch position and the left right and left draft forces at step 102. Next at step 104, the draft force values are used in Equation (2) to calculate the present, actual collective draft force (referred to as the Draft Load) that is exerted on the implement.

Draft Load=Maximum(Right Draft Force,Left Draft Force)+Gain1*abs(Right Draft Force−Left Draft Force) (2)

where Gain1 is a predefined factor that specifies the sensitivity of the force difference.

This Draft Load value is used to control the position of the implement 10, unless the draft force is so great that its use results in the control system raising the implement beyond the upper threshold position set by the configuration routine 80. Below the upper threshold position, if the Draft Load value is greater than the Draft Setpoint, the implement is raised to bite a lesser amount into the soil, in an attempt to reduce the draft forces exerted on the hitch 12. If only this simply control technique is used, however, it is possible under very dense soil conditions or simply because of hitch geometry that the draft force could cause the implement to be raised out of the soil. To prevent this from happening, the hitch control routine 100 derates the Draft Load value as computed above, when the actual position of the implement reaches the upper threshold position. In other words, when the implement is raised a significant distance above the desired depth position, the responsiveness to the derivation of the Draft Load from the Draft Setpoint is reduced.

Whether the Draft Load value needs to be derated is determined at step 106 where the actual position of the hitch 12, as indicated by the signal from the position sensor 70, is compared to the threshold position set by the operator. If the actual position is below that threshold position, the Draft Load value is used unchanged by setting a variable designated "Hitch Draft Load" equal to the Draft Load value at step 107 before advancing to step 110. If, however, the actual hitch position is above the threshold position, the program execution branches to step 108 at which the Draft Load value is derated. The amount of that derating, or reduction in the Draft Load value that is used in the control process, is determined based on how much the actual position is above the upper threshold position. The Draft Load value is derated in proportion to that amount as given by Equation (3):

$$\text{Hitch Draft Load} = \left(\frac{\text{Upper Limit Position} - \text{Actual Position}}{\text{Upper Limit Position} - \text{Upper Threshold Position}}\right) * \text{Draft Load} \quad (3)$$

where the Upper Limit Position is the highest position to which the implement can be physically raised with respect to the tractor as determined by the mechanical design of the three point hitch 12. Nevertheless, another position may be defined as the Upper Limit Position.

Then at step 110, the Hitch Draft Load value, as determined at either step 107 or 108, is employed to calculate a Draft Force Error according to Equation (4):

$$\text{Draft Force Error} = (\text{Hitch Draft Load} - \text{Draft Setpoint}) * \text{Gain2} \quad (4)$$

where Gain2 is a factor that specifies the sensitivity of the force error and is defined by position of the mix input device 76. The Draft Force Error indirectly provides an indication of the degree that the position of the implement 10 must be changed from the present position so that the draft force being exerted on the hitch 12 will equal the Draft Force setpoint. The arithmetic sign of the Draft Force Error denotes the direction that the hitch should be moved.

Thus, at step 112, the Draft Force Error value is inspected to determine if it is positive, indicating that the implement needs to be raised to reduce the draft forces. If such is the case, the hitch control routine 100 branches to step 114 where an inspection is made whether the hitch 12 has already been raised to its upper limit position. In that event, the control routine closes the electrohydraulic valve 60 at step 115 to terminate further application of pressurized fluid to the hydraulic actuators 27 and 28 that may be occurring, before returning to step 102. Otherwise, if the hitch 12 still can be physically raised, the hitch control routine 100 branches from step 114 to step 116 at which the controller 66 sends a signal to open the electrohydraulic valve 60 in case it is presently closed. This opening the valve applies pressurized fluid from the supply line 58 to the workport 65 and thus into the head chambers of the lift hydraulic actuators 27 and 28. This causes the three point hitch 12 to raise the implement 10. The hitch control routine 100 then returns to step 102 to commence another execution pass.

Alternatively, if a non-positive value of the Draft Force Error is found at step 112, execution of the hitch control routine branches to step 118 where the Draft Force Error is inspected to determine if it is negative, indicating that the implement 10 should be lowered. If that is the case, the hitch control routine branches to step 120 where a determination is made whether the hitch position is at its lower limit, i.e. the lowest physically possible position due to the mechanical constraints of the three point hitch. If the hitch 12 at the lower limit, the control process branches to step 115 at which the electrohydraulic valve is closed before returning directly to step 102. Otherwise if the analysis at step 120 indicates that the hitch 12 still can be physically lowered, the hitch control routine 100 branches to step 122. Now the controller 66 opens the valve 60 to a position in which the workport 65 is connected to the tank return line 62, thereby releasing fluid from the lift hydraulic actuators 27 and 28. This release of fluid causes the three point hitch 12 to lower the implement 10 due to gravity. The hitch control routine then returns to step 102 to repeat another execution pass.

It is possible that at step 118 the Draft Force Error value is found to be non-negative, which occurs when the value is zero. In this case, the Hitch Draft Force is at the draft force setpoint and no position adjustment of the implement is required. Now execution of the hitch control routine 100 advances to step 124 at which the controller 66 ensures that the electrohydraulic valve 60 is closed before returning to step 102 to commence another pass through the routine.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for controlling a hitch on a vehicle, wherein the hitch is raised and lowered by a hydraulic actuator, said method comprising:
    defining a draft setpoint that specifies an amount draft force desired to be exerted on the hitch;
    sensing a first draft force acting on one side of the hitch;
    sensing a second draft force acting on another side of the hitch;
    deriving a draft load as a function of a greater one of the first draft force and the second draft force and of a difference between the first and second draft forces;
    producing a draft force error in response to the draft load and the draft setpoint; and
    operating the hydraulic actuator in response to the draft force error to selectively raise and lower the hitch.

2. The method as recited in claim 1 wherein defining a draft setpoint comprises operating the vehicle while:
    sensing a first plurality of samples of the first draft force;
    sensing a second plurality of samples the second draft force;
    calculating a first average of the first plurality of samples;
    calculating a second average of the second plurality of samples;
    deriving the draft setpoint as a function of a greater one of the first average and the second average and of a difference between the first and second averages.

3. The method as recited in claim 2 wherein deriving the draft setpoint adds the greater one of the first average and the second average to a term based on an absolute value of the difference between the first and second averages.

4. The method as recited in claim 2 wherein deriving the draft setpoint employs the following equation:

$$\text{Draft Setpoint} = \text{Maximum}(\text{first average}, \text{second average}) + \text{Gain} * \text{abs}(\text{first average} - \text{second average})$$

where the "Maximum" term selects the greater of the first and second averages, the "abs" term selects the absolute value of the difference between the first and second averages, and the Gain is a factor that defines a sensitivity for the difference.

5. The method as recited in claim 1 wherein deriving a draft load adds the greater one of the first draft force and the second draft force to a term based on an absolute value of the difference between the first and second draft forces.

6. The method as recited in claim 1 wherein deriving a draft load employs the following equation:

$$\text{Draft Load} = \text{Maximum}(\text{first draft force}, \text{second draft force}) + \text{Gain1} * \text{abs}(\text{first draft force} - \text{second draft force})$$

where the "Maximum" term selects the greater of the first and second draft forces, the "abs" term selects the absolute value of the difference between the first and second draft forces, and the Gain1 is a factor that defines a sensitivity for the difference.

7. The method as recited in claim 1 further comprising defining a threshold position for the hitch; and derating the draft load in response to an amount that an actual position of the hitch exceeds the threshold position.

8. The method as recited in claim 1 wherein there is a position limit for motion of the hitch, and further comprising:
    defining a threshold position for the hitch;
    producing a hitch draft load value in response to the draft load, a first relationship between an actual position of the hitch and the position limit, and in response to a second relationship between the threshold position and the position limit; and producing the draft force error in response to the hitch draft load value.

9. The method as recited in claim 8 wherein producing a hitch draft load value comprises deriving a first difference between the actual position of the hitch and the position limit, and deriving a second difference between the threshold position and the position limit.

10. The method as recited in claim 8 wherein producing a hitch draft load value employs the following equation:

$$\text{Hitch Draft Load} = \left(\frac{\text{Position Limit} - \text{Actual Position}}{\text{Position Limit} - \text{Upper Position Threshold}}\right) * \text{Draft Load}.$$

11. A method for controlling a hitch on a vehicle, wherein the hitch can be moved between a first position limit and second position limit by a hydraulic actuator, said method comprising:

defining a draft setpoint that specifies an amount of draft force desired to be exerted on the hitch;

defining a threshold position between the first and second position limits;

sensing a first draft force acting on one side of the hitch;

sensing a second draft force acting on another side of the hitch;

deriving a draft load as a function of the first draft force and the second draft force;

when an actual position of the hitch is less than the threshold position, setting a hitch draft load value equal to the draft load;

when the actual position of the hitch is greater than the threshold position, setting the hitch draft load value in response to the draft load, a first relationship between an actual position of the hitch and the first position limit, and a second relationship between the threshold position and the first position limit; and producing the draft force error in response to the hitch draft load value and the draft setpoint; and operating the hydraulic actuator in response to the draft force error to selectively raise and lower the hitch.

12. The method as recited in claim 11 wherein, when the actual position of the hitch is greater than the threshold position, setting the hitch draft load value comprises deriving a first difference between the actual position of the hitch and the first position limit, and deriving a second difference between the threshold position and the first position limit.

13. The method as recited in claim 11 wherein, when the actual position of the hitch is greater than the threshold position, setting the hitch draft load value employs the following equation:

$$\text{Hitch Draft Load} = \left(\frac{\text{First Position Limit} - \text{Actual Position}}{\text{First Position Limit} - \text{Upper Position Threshold}}\right) * \text{Draft Load}.$$

14. The method as recited in claim 11 wherein defining a draft setpoint comprises operating the vehicle while:

sensing a first plurality of samples of the first draft force;

sensing a second plurality of samples the second draft force;

calculating a first average of the first plurality of samples;

calculating a second average of the second plurality of samples;

deriving the draft setpoint as a function of a greater one of the first average and the second average and of a difference between the first and second averages.

15. The method as recited in claim 14 wherein deriving the draft setpoint adds the greater one of the first average and the second average to a term based on an absolute value of the difference between the first and second averages.

16. The method as recited in claim 14 wherein deriving the draft setpoint employs the following equation:

Draft Setpoint=Maximum(first average,second average)+Gain*abs(first average−second average)

where the "Maximum" term selects the greater of the first and second averages, the "abs" term selects the absolute value of the difference between the first and second averages, and the Gain is a factor that defines a sensitivity for the difference.

17. The method as recited in claim 11 wherein the draft load is derived as a function of a greater one of the first draft force and the second draft force and of a difference between the first and second draft forces.

18. The method as recited in claim 11 wherein deriving a draft load adds a greater one of the first draft force and the second draft force to a term based on an absolute value of a difference between the first and second draft forces.

19. The method as recited in claim 11 wherein deriving a draft load employs the following equation:

Draft Load=Maximum(first draft force,second draft force)+Gain1*abs(first draft force−second draft force)

where the "Maximum" term selects the greater of the first and second draft forces, the "abs" term selects the absolute value of the difference between the first and second draft forces, and the Gain1 is a factor that defines a sensitivity for the difference.

20. A method for controlling a hitch on a vehicle, wherein the hitch can be moved between a first position limit and second position limit by a hydraulic actuator, said method comprising:

defining a draft setpoint that specifies an amount of draft force desired to be exerted on the hitch;

defining a threshold position between the first and second position limits;

sensing a first draft force acting on one side of the hitch;

sensing a second draft force acting on another side of the hitch;

deriving a draft load as a function of the first draft force and the second draft force;

when an actual position of the hitch is less than the threshold position, setting a hitch draft load value equal to the draft load;

when the actual position of the hitch is greater than the threshold position, setting the hitch draft load value derived as a function of the draft load and an amount that the actual position of the hitch exceeds the threshold position; and producing the draft force error in response to the hitch draft load value and the draft setpoint; and operating the hydraulic actuator in response to the draft force error to selectively raise and lower the hitch.

* * * * *